United States Patent
Kamperman

(10) Patent No.: US 8,831,272 B2
(45) Date of Patent: Sep. 9, 2014

(54) CONTENT ITEM IDENTIFIER

(75) Inventor: Franciscus L.A.J. Kamperman, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 313 days.

(21) Appl. No.: 13/124,176

(22) PCT Filed: Oct. 7, 2009

(86) PCT No.: PCT/IB2009/054393
§ 371 (c)(1),
(2), (4) Date: Apr. 14, 2011

(87) PCT Pub. No.: WO2010/044014
PCT Pub. Date: Apr. 22, 2010

(65) Prior Publication Data
US 2011/0200224 A1  Aug. 18, 2011

(30) Foreign Application Priority Data
Oct. 14, 2008 (EP) .................... 08166527

(51) Int. Cl.
G06K 9/00 (2006.01)
G06T 1/00 (2006.01)
G06F 21/10 (2013.01)
H04L 9/32 (2006.01)
H04N 21/8358 (2011.01)

(52) U.S. Cl.
CPC ....... *G06T 1/0028* (2013.01); *G06T 2201/0052* (2013.01); *G06T 2201/0053* (2013.01); *G06F 2221/0737* (2013.01); *H04L 2209/603* (2013.01); *G06F 21/10* (2013.01); *H04L 9/3247* (2013.01); *H04N 21/8358* (2013.01); *H04L 2209/608* (2013.01)

USPC ........... 382/100; 382/115; 382/119; 713/176; 713/177; 713/179; 713/180; 713/181

(58) Field of Classification Search
USPC .................... 382/100; 713/168–171
See application file for complete search history.

(56) References Cited

U.S. PATENT DOCUMENTS 4,673,974 A *  6/1987  Ito et al. ................. 348/159
5,768,382 A *  6/1998  Schneier et al. ........ 380/251

(Continued)

FOREIGN PATENT DOCUMENTS

WO  WO0123981 A1  4/2001
WO  WO2008068640 A2  6/2008

OTHER PUBLICATIONS

Stephen M. Matyas et al: "Digital Signatures - An Overview", Computer Networks, North Holland, Amsterdam, NL, vol. 3, No. 2, Apr. 1, 1979, pp. 87-94, XP024239446.

(Continued)

Primary Examiner — Jayesh A Patel
Assistant Examiner — Iman K Kholdebarin
(74) Attorney, Agent, or Firm — Larry Liberchuk

(57) ABSTRACT

A system (50) is used for identifying a content item. The system (50) receives a received first identifier (101) of the content item, the received first identifier being based on at least part of a baseband level representation of the content item; a received second identifier (102) of the content item, the received second identifier being based on at least part of an encoded representation (103) of the content item; and the at least part of the encoded representation (103) of the content item. The system comprises a second identifier generator (53) for generating a generated second identifier based on the at least part of the encoded representation (103) of the content item; and a validation unit (54) for validating the received first identifier as a valid first identifier of the content item if the generated second identifier matches the received second identifier.

9 Claims, 2 Drawing Sheets

(56) References Cited

U.S. PATENT DOCUMENTS

| | | | | |
|---|---|---|---|---|
| 6,314,518 B1* | 11/2001 | Linnartz | ....................... | 713/176 |
| 6,480,607 B1* | 11/2002 | Kori et al. | ....................... | 380/201 |
| 6,532,541 B1* | 3/2003 | Chang et al. | ................... | 713/176 |
| 6,557,102 B1* | 4/2003 | Wong et al. | .................... | 713/176 |
| 7,240,205 B2* | 7/2007 | Greene et al. | ................ | 713/176 |
| 7,362,862 B2* | 4/2008 | Schneier et al. | ............. | 380/251 |
| 7,487,128 B2* | 2/2009 | Spagna et al. | .................. | 705/51 |
| 7,555,779 B2* | 6/2009 | Nakano et al. | ................. | 726/26 |
| 7,716,077 B1* | 5/2010 | Mikurak | ....................... | 705/7.12 |
| 8,090,950 B2* | 1/2012 | Shevade | ....................... | 713/176 |
| 8,190,900 B2* | 5/2012 | Corndorf | ...................... | 713/172 |
| 2002/0049760 A1* | 4/2002 | Scott et al. | ....................... | 707/10 |
| 2002/0136428 A1* | 9/2002 | Sugahara et al. | ............. | 382/100 |
| 2003/0028543 A1* | 2/2003 | Dusberger | .................... | 707/100 |
| 2003/0131239 A1* | 7/2003 | Greene et al. | ................ | 713/176 |
| 2003/0152222 A1* | 8/2003 | Nakano et al. | ............... | 380/201 |
| 2003/0187798 A1* | 10/2003 | McKinley et al. | ............. | 705/50 |
| 2004/0139344 A1* | 7/2004 | Maurer | ........................ | 713/200 |
| 2005/0097329 A1* | 5/2005 | Morimoto et al. | ............ | 713/176 |
| 2006/0059400 A1* | 3/2006 | Clark et al. | ................... | 714/752 |
| 2006/0093142 A1* | 5/2006 | Schneier et al. | ............. | 380/251 |
| 2006/0136723 A1* | 6/2006 | Taylor | ........................... | 713/168 |
| 2006/0187358 A1* | 8/2006 | Lienhart et al. | ............... | 348/661 |
| 2007/0016790 A1* | 1/2007 | Brundage et al. | ............. | 713/176 |
| 2008/0028439 A1* | 1/2008 | Shevade | ........................... | 726/3 |
| 2008/0033740 A1* | 2/2008 | Cahn et al. | ........................ | 705/1 |
| 2008/0044017 A1* | 2/2008 | Nakano et al. | ................. | 380/201 |
| 2008/0140433 A1* | 6/2008 | Levy et al. | ........................ | 705/1 |
| 2008/0219495 A1* | 9/2008 | Hulten et al. | .................. | 382/100 |
| 2009/0038016 A1* | 2/2009 | Epstein | ............................ | 726/27 |
| 2009/0182672 A1* | 7/2009 | Doyle | ............................. | 705/64 |
| 2011/0016328 A1* | 1/2011 | Qu et al. | ....................... | 713/189 |
| 2011/0200224 A1* | 8/2011 | Kamperman | ................. | 382/100 |
| 2012/0096276 A1* | 4/2012 | Shevade | ....................... | 713/176 |

OTHER PUBLICATIONS

M. Maes et al., "Digital Watermarking for DVD Video Copy Protection", IEEE Signal Processing Magazine, Sep. 2000, vol. 17, issue 5, pp. 47-57.

* cited by examiner

CONTENT ITEM IDENTIFIER

FIELD OF THE INVENTION

The invention relates to a method and system for verifying or providing a content item identifier. The invention also relates to a signal comprising an identifier of a content item. The invention also relates to handling of fingerprints or watermarks of a content item.

BACKGROUND OF THE INVENTION

Content identification may be performed through fingerprinting. Fingerprints of content may be verified anywhere content is stored, forwarded, transmitted, or received. For example, fingerprints of content may be verified at the ISP level and even at the home device level. Once content has been identified policies can be attached to actions on that content, e.g. for copyright protection. Such content identification may be used as an alternative to digital rights management or in addition to digital rights management techniques. Content identification can be performed by means of fingerprint and/or watermark techniques. Fingerprint techniques involve deriving an identifier which uniquely identifies the content itself, regardless of the way the content is represented. Watermark techniques can be used to embed an identifier in a copy of a content item in a way in which it is difficult to remove the watermark identifier from the content. Such a watermark can be used to trace the origin of a copy of a content item. Fingerprinting and watermarking is relevant, for example, in a network data transport server for identifying the content being transported and in a consumer electronics device for identifying the content being received or rendered. To detect the fingerprint or watermark of a content item, the content item is processed at baseband audio/video level, which is computationally expensive from a processing point of view and may involve de-multiplexing and decoding (e.g. decompressing) of the coded data.

SUMMARY OF THE INVENTION

It would be advantageous to have an improved system for identifying a content item. To better address this concern, in a first aspect of the invention a system is presented that comprises
an input for receiving:
    a received first identifier of the content item, the received first identifier being based on at least part of a baseband level representation of the content item;
    a received second identifier of the content item, the received second identifier being based on at least part of an encoded representation of the content item; and
    the at least part of the encoded representation of the content item;
the system further comprising:
    a second identifier generator for generating a generated second identifier based on the at least part of the encoded representation of the content item; and
    a validation unit for validating the received first identifier as a valid first identifier of the content item if the generated second identifier matches the alleged second identifier.

Since the generated second identifier is based on at least part of the encoded representation of the content item, it is not necessary to decode the encoded representation of the content item for obtaining the generated second identifier. Since the validation unit can validate the received first identifier by matching the generated second identifier with the received second identifier, a validated first identifier can be obtained without decoding the content item into a baseband level representation. Since the step of decoding is not necessary, the identification is less computationally expensive. Furthermore, the first identifier, which can be a known content-based fingerprint or watermark, does not have to be computed by the system from the baseband content because it is provided via the input. It is prevented that a wrong first identifier is used with the content item by also supplying the alleged second identifier. The second identifier can be easily reproduced by the system by processing the encoded representation. If the generated second identifier matches the alleged second identifier, it can be concluded that the encoded content item is associated with the alleged second identifier. Since the encoded content item comprises an encoded representation of a baseband level representation of the content item, it can be concluded that the alleged first identifier is a valid first identifier of the content item.

The received first identifier may be indicative of a fingerprint of the baseband level representation or a watermark embedded in the baseband level representation of the content item. Such a fingerprint or watermark may represent an identifier of the content, independent of the actual data format or image resolution of the baseband level data. A fingerprint may uniquely identify a content item based on the actual content, whereas a watermark may represent an identifier which is added to the data in a tamper resistant way. Fingerprints and watermarks as such are known in the art.

The second identifier may be indicative of a hash value of the at least part of the encoded representation of the content item. The hash value is easily and efficient to compute. However, it uniquely identifies the encoded representation of the content item, because a small change to the encoded representation of the content item results in a different hash value. This allows the validation unit to validate the first received identifier with a relatively high degree of certainty.

A first identifier requester may be provided for requesting a validated first identifier of the content item from an external source if the generated second identifier does not match the received second identifier. For example, the at least part of the encoded representation of the content item, as received by the input, may be transmitted to the external source. The external source may decode the content to the baseband level and compute the validated first identifier of the content item. This provides a fallback scenario in case the validation of the received first identifier fails, without needing the computational resources for decoding the content.

A first identifier generator may be provided for generating a computed first identifier by processing the at least part of the baseband level representation of the content item if the generated second identifier does not match the received second identifier. This provides an alternative fallback scenario which allows the system to compute a valid first identifier without using an external source.

The encoded representation of the content item may comprise at least part of a compressed representation, a multiplex level representation, or a transport level representation of the at least part of the baseband level representation of the content item. Such representations are usually found in storage media and during transport of content items over a network. Consequently, not much processing of the content item is necessary to compute the second identifier, because the second identifier is based on the representation in which the content item is already available.

The input may be arranged for receiving a signed message comprising the received first identifier and the received second identifier, and further comprising a signature handler for validating a signature of a signed message. The signed message associates the received first identifier with the received second identifier in a tamper resistant way. This makes it difficult for a malicious user to associate the received first identifier with another second identifier. The signed message may be a cryptographically signed message.

A system for providing a content item identifier may be provided comprising:
  a first identifier generator for generating a first identifier of a content item based on at least part of a baseband level representation of the content item;
  a second identifier generator for generating a second identifier of the content item based on at least part of an encoded representation of the content item;
  a message generator for generating a message comprising the first identifier and the second identifier.

This system can generate the identifiers and connects them together in a message. The identifiers generated by this system may be used by another device for obtaining a validated first identifier without having to decode the encoded representation of the content item.

A signature generator may be provided for digitally signing the message. This makes the association between the first identifier, the second identifier, and the content item more tamper resistant.

A signal may be provided comprising a representation of a digitally signed message comprising:
  a first identifier generated based on at least part of a baseband level representation of a content item; and
  a second identifier generate based on at least part of an encoded representation of the content item.

The signal may be generated and/or used in the systems set forth. The at least part of the encoded representation of the content item may also be included in the signal.

A method of identifying a content item comprises:
  receiving a received first identifier of a content item, the received first identifier being based on at least part of a baseband level representation of the content item;
  receiving a received second identifier of the content item, the received second identifier being based on at least part of an encoded representation of the content item;
  receiving the at least part of the encoded representation of the content item;
  generating a generated second identifier of the content item based on the at least part of the encoded representation of the content item; and
  validating the received first identifier as a valid first identifier of the content item if the generated second identifier matches the received second identifier.

A method of providing a content item identifier comprises:
  generating a first identifier of a content item based on at least part of a baseband level representation of the content item;
  generating a second identifier of the content item based on at least part of an encoded representation of the content item; and
  generating a message comprising the first identifier and the second identifier.

A computer program product may comprise instructions for causing a processing system to perform at least one of the methods set forth.

BRIEF DESCRIPTION OF THE DRAWINGS

These and other aspects of the invention will be further elucidated and described with reference to the drawing, in which.

DETAILED DESCRIPTION OF EMBODIMENTS

Figure 1:
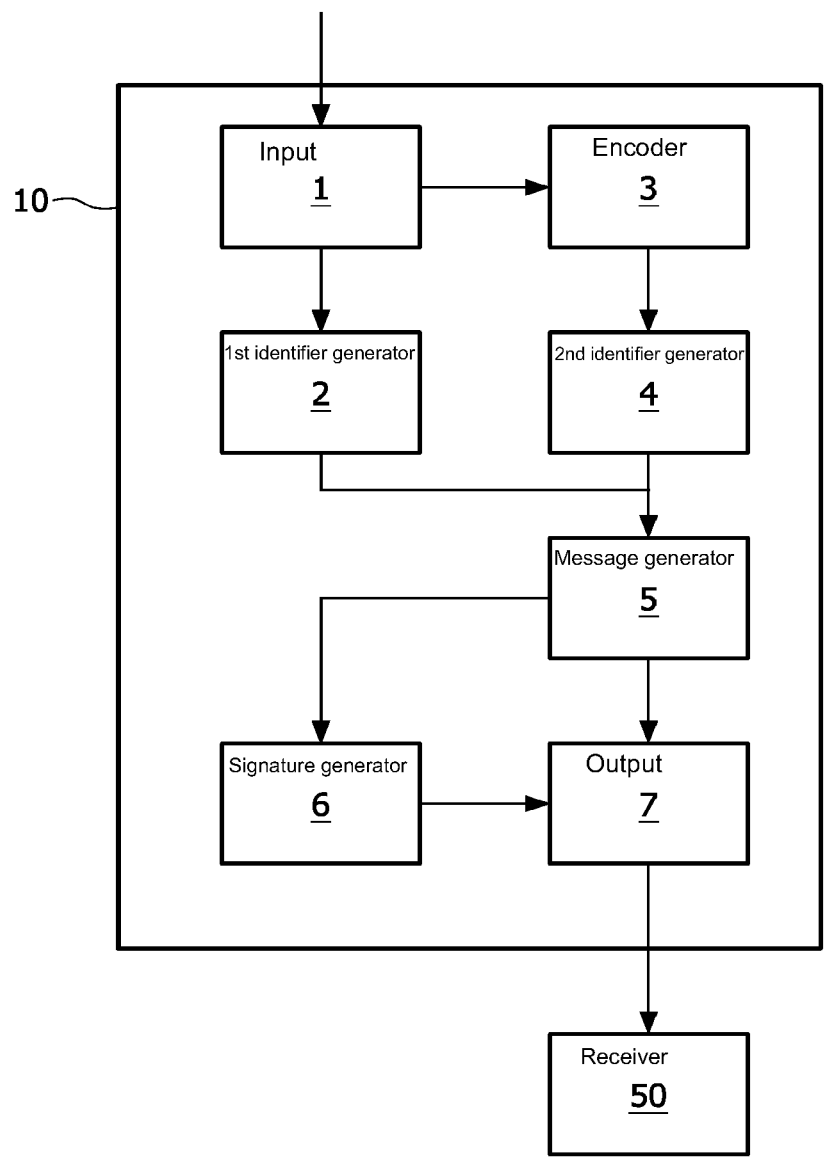
FIG. 1 shows a diagram of a system for providing a content item identifier.

Hereinafter, a few examples are presented. After that, the Figures illustrating several techniques in a broader context will be discussed.

In a first example, an MPEG-TS which contains multiplexed and encoded digital video is considered. However, the solutions presented can also be applied to other content encoding and packaging methods. In the example, a fingerprint detector, according to state-of-the-art, may determine a fingerprint value FPV_1 over a portion of content having a playback time duration of t_1. The fingerprint detector is compliant with the rules and conditions set by a trusted third party. Therefore this device can be trusted to output correct fingerprint values, because the trusted third party is (by definition) trusted. The fingerprint detector may contain a secret private key PrivKey_FPD, and may be certified by a trusted third party (TTP) which has issued a certificate Sign_PrivKey_TTP {info, PubKey_FPD)} to the fingerprint detector. Furthermore the public key of the trusted third party (PubKey_TTP) may be publicly known.

An MPEG-TS consists of transport packets, which contain a header (4 Bytes) and data (184 Bytes). The header contains a packet identifier (PID). Via the packet identifier packets belonging to a video stream can be found, because a particular video stream is contained in transport packets having the same PID value.

Next, the fingerprint detector starts determining a fingerprint over a portion of a content stream which is contained in N transport packets with a certain PID. The detector also calculates a hash value, for example using the SHA (Secure Hash Algorithm) algorithm, over every transport packet used. This hash value is denoted as H(transport packet(n)), where n∈{1 ... N}. After the hash values of the individual transport packets have been computed, the detector may determine an overall hash value by computing a hash value over a concatenation of the hash values H(transport packet(n)), where n∈{1 ... N}, as is denoted in the formula:

$$H(1 \ldots N) = H\{\text{transportpacket}(1) \| \ldots \| \text{transportpacket}(N)\},$$

wherein ∥ denotes concatenation, H{} denotes hash computation, and H(1 ... N) denotes the hash value of the concatenation of the transport packets 1 to N. The fingerprint detector may then construct an object $$\{PID \| H(1) \| N \| H(1 \ldots N) \| FPV\},$$

wherein PID denotes the package identifier, H(1) denotes the hash value of transport packet 1, N denotes the number of packets, and FPV denotes the fingerprint value. This object may be signed with a private key of the fingerprint detector to obtain $$\text{Sign}_{PrivKey\_Fp}\{PID \| H(1) \| N \| H(1 \ldots N) \| FPV\},$$

wherein $\text{Sign}_{PrivKey\_FP}$ denotes a signature using a private key of the fingerprint detector (FPD). The meaning of this signed object is that the video in transport packets with PID number PID, starting with transport packet with hash value H(1) and ending N packets later, have fingerprint value FPV, and are not tampered with if the locally calculated hash value over these N packets is H(1 ... N) and the verification of the signature using the public key of the fingerprint detector, PubKey_FP, is successful. The signed data object as described above may be transported together with the video. This may be done by including it as a separate descriptor to the PMT (Program Map Table). However, other ways of binding the signed data object to the content are also possible.

The above is a specific example of how a fingerprint value can be attached to a content item in a tamper resistant way. More robustness may be added, for example for countering transmission errors, specific types of attacks, etc.

A device for extracting and transferring a content fingerprint value may be provided, arranged for determining a fingerprint value of content data on content baseband level, determining a hash value of the content data at multiplex level, generating a data structure containing information relating to a sync pattern for the start packet, end packet, the hash value, and the fingerprint value, and associating this data structure with the multiplex level data containing the fingerprinted content data.

In the Figures, like reference numerals indicate like elements. The Figures are simplified block diagrams. The elements of the systems discussed in this description are optional. Several combinations of the elements can be combined to advantage.

FIG. 1 illustrates a system 10 for providing a content item identifier. The system 10 may comprise an input 1 for receiving a content item. For example, input 1 is arranged for receiving a baseband level representation of the content item. Such a baseband level representation comprises a non-compressed, plain form representation of the content item. Such a baseband level representation of a content item may have several formats. For example, in case of audio, a wave file or raw audio CD waveforms are examples of a baseband level representation. In case of a video item, the baseband level representation may comprise raw video, for example represented in YCbCr, RGB, or a similar format. However, this is not a limitation.

The format of base-band level data may be different, and sometimes also includes a Frequency domain representation, a discrete cosine transform domain representation, etc. Some examples of baseband level formats are discussed in the article "Digital Watermarking for DVD Video Copy Protection", by M. Maes et al., IEEE Signal Processing Magazine, September 2000, Vol. 17, issue 5, pp. 47-57. In the simplest approach no transformation is performed, and the fingerprint or watermark is directly detected in the base-band video. However, this is not a limitation. Fingerprints or watermarks may be detected, for example, in a frequency domain. Such detection may be preceded by a frequency domain transform. Well-known transforms include: the Fourier transform (FT), the discrete cosine transform (DCT) and the wavelet transform (WT). By using for example some correlation-like method, the fingerprint or watermark may be detected in the transform domain. The frequency transforms may be performed on a block-by-block basis, for example.

Input 1 may also be arranged to receive encoded data, for example compressed data such as MPEG compressed audio and/or video data. Input 1 may also be arranged for receiving multiplexed data or encrypted data as the encoded representation. The data may be received from an internal memory, hard disk, data server, removable media, or any other source. In many situations, the data would be received from a database of content items of a content distributor. If only one representation of the content item is provided, it may be converted between baseband level and encoded level to make both representation available. For example, if only the baseband level representation is received by input 1, an encoder 3 may be provided for encoding the baseband level representation for obtaining the encoded representation of the content item.

The baseband level representation of the content item is provided to a first identifier generator 2. The first identifier generator may generate a first identifier 101 of a content item based on at least part of the baseband level representation of the content item. To this end, the first identifier generator 2 processes the baseband level representation, for example by computing a digital fingerprint or watermark, although, for example, a hash value would also be possible. The content item may also contain a representation of the first identifier, since the first identifier can be established by processing the baseband level content item. For example, a fingerprint or a watermark are intrinsic to or embedded in the content item. The first identifier 101 preferably is tamper resistant in the sense that it is difficult for a malicious user to change the content item, without damaging the content, in such a way that the first identifier cannot be extracted from the content item any more. This is achieved, for example, using a first identifier based on fingerprinting or watermarking.

The encoded representation of the content item is provided to a second identifier generator 4 for generating a second identifier 102 of the content item. The second identifier 102 is generated based on at least part of an encoded representation 103 of the content item. For example, a hash is computed of the encoded representation 103. However, it would also be possible to compute for example a fingerprint value of the encoded representation.

The first identifier and the second identifier are forwarded to a message generator 5 which may generate a message 100 comprising the first identifier 101 and the second identifier 102. The message 100 may be digitally signed by a signature generator 6. The signature generator may digitally sign the message 100 in a way known in the art.

The signed message is provided to the output 7 for distribution to one or more receivers 50. This distribution may be by means of removable media, such as DVD or Blu-Ray disc, or by means of the Internet or any other suitable digital data communications network, including digital broadcasting network such as digital cable television or a DVB compliant digital broadcast.

Figure 3:
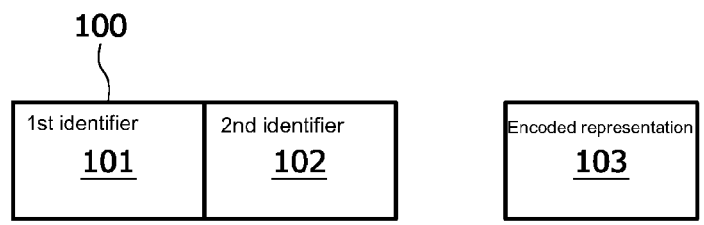
FIG. 3 shows a diagram of several data elements.

FIG. 3 illustrates data generated with the system 10. This data may be contained in a signal which is communicated to one or more receivers 50. The data comprises a message 100 which may be digitally signed. The message 100 comprises a first identifier 101 generated based on at least part of a baseband level representation of a content item, and a second identifier 102 generated based on at least part of an encoded representation 103 of the content item. The encoded representation 103 may be comprised in the same signal. It may also be distributed separately. The second identifier 102 ensures that the message 100 is associated with the correct (part of the) encoded representation of the content item.

Figure 2:
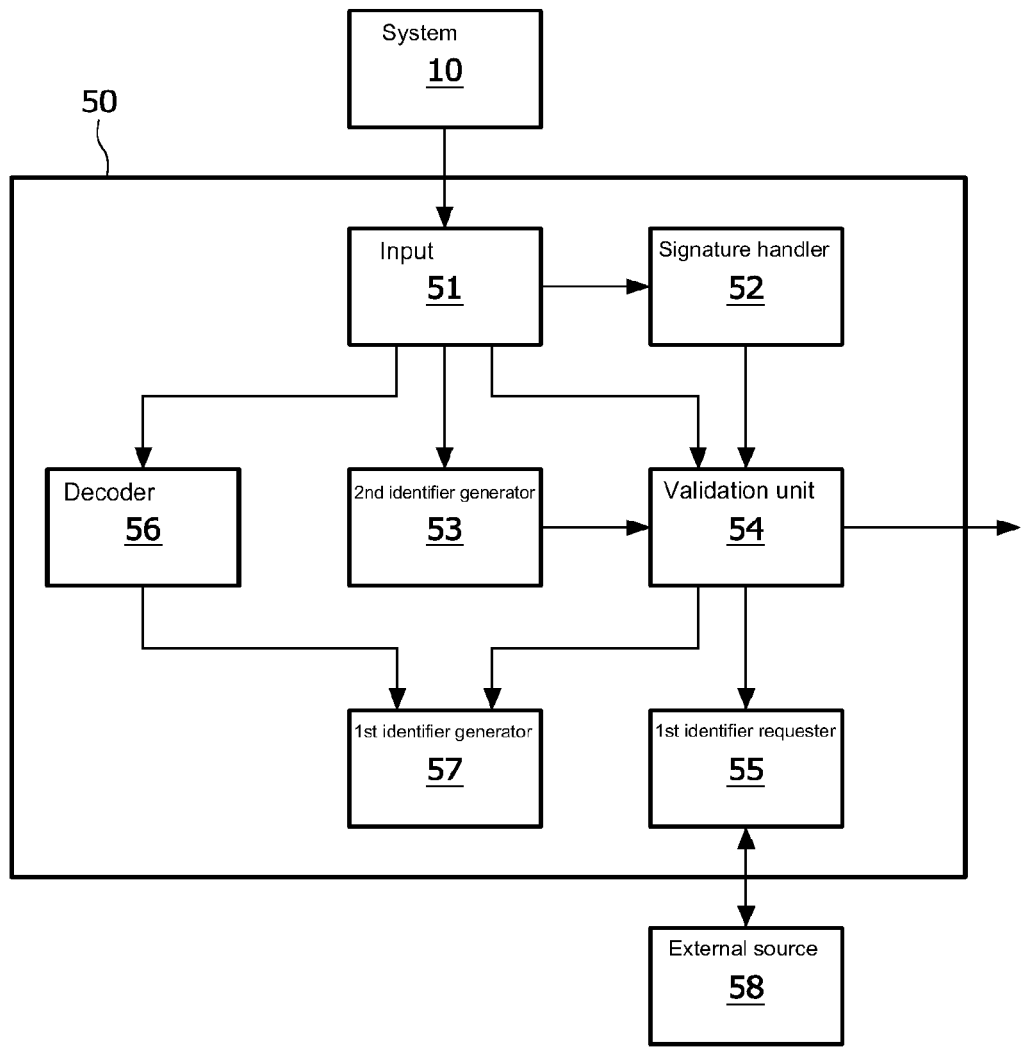
FIG. 2 shows a diagram of a system for identifying a content item.

FIG. 2 illustrates a system 50 for identifying a content item. The system comprises an input 51 for receiving several data items from a system 10 for providing a content item identifier, including a received first identifier 101 of a content item, and a received second identifier 102 of a content item. As discussed above, different distribution and communication methods may be used to communicate the data to input 51 of system 50. The received first identifier 101 is allegedly generated by processing at least part of a baseband level representation of a content item. The received second identifier 102 is allegedly generated by processing at least part of an encoded representation of the content item. The system 50 may perform several tests for assessing the validity of the received identifiers. Also, input 51 may receive at least part of the encoded representation 103 of the content item. The received first identifier 101 may be based on at least part of a baseband level representation of the content item. This received first identifier 101 may have been computed by the first identifier generator 2 of the system 10. The received second identifier 102 may be based on at least part of an encoded representation 103 of the content item. The received second identifier 102 may have been computed by the second identifier generator 4 of system 10. The ways in which identifiers 101 and 102 may be computed has been elaborated in respect of FIG. 1. The input 51 may also receive the at least part of the encoded representation 103 of the content item. This may be received from system 10 or from another source, as the case may be.

The at least part of the encoded representation 103 of the content item is forwarded to a second identifier generator 53. This second identifier generator may generate a generated second identifier by processing the encoded representation 103.

The generated second identifier and the received second identifier 102 may be provided to a validation unit 54. This validation unit 54 compares the generated second identifier with the received second identifier (the latter being allegedly generated by processing at least part of the encoded representation 103 of the content item). If they match, the validation is successful. A match may mean that the generated second identifier is equal to the received second identifier 102. However, it is also possible that a tolerance is allowed. This depends on the algorithmic formula used to generate these identifiers and on the level of security desired. The result of the validation (e.g. successful or unsuccessful) may be provided as an output. This output may be used to control local playback privileges with respect to the content item on a media player, for example.

The device 50 can determine the first identifier of the content item in a relatively easy way. This determination can be made secure. The techniques described herein allow a relatively simple device to handle content identifiers which would normally need substantial computational resources. For example, a more powerful device can establish the first identifier of the content item, for example by computing a fingerprint of the content item. The first identifier (for example, fingerprint results) may then be securely coupled to the multiplexed and coded digital stream, such that they can be easily retrieved by another device, but cannot be tampered with. Security features such as a digital signature are entirely optional. For example, in a trusted environment, such security features may not be necessary.

The received first identifier 101 may be indicative of a fingerprint of or a watermark embedded in the baseband level representation of the content item. The received second identifier 102 may be indicative of a hash value of the at least part of the encoded representation of the content item. A first identifier requester 55 may be provided for requesting a validated first identifier of the content item from an external source 58 if the generated second identifier does not match the received second identifier 102. The external source may comprise a server system of a content provider, for example.

A decoder 56 may be provided for decoding the at least part of the encoded representation into at least part of the baseband level representation of the content item. A first identifier generator 57 may be arranged for generating a computed first identifier by processing the at least part of the baseband level representation of the content item if the generated second identifier does not match the received second identifier 102.

The encoded representation 103 of the content item may comprise at least part of a compressed representation, a multiplex level representation, or a transport level representation of the at least part of the baseband level representation of the content item. Such representations may be put in an MPEG format, using MPEG compression and MPEG multiplexing to generate MPEG transport streams, for example. However, other formats are also possible.

The input 51 may be arranged for receiving a signed message 100 comprising the received first identifier 101 and the received second identifier 102. To verify the digital signature of the signed message 100, a signature handler 52 is provided for validating a signature of a signed message. The result of this validation of the signature is provided to the validation unit 54 which may take this result into account. If the signature was found to be invalid, the received first identifier should not be accepted as a valid first identifier.

Both systems 10 and 50 may be implemented as computer instructions for execution on a computer system. To this end, a memory (e.g. RAM, flash, hard disc) may be provided for storing the computer instructions and the messages and content item representations. The inputs 51 and 1 may also be arranged for retrieving their input data from such memory. The output 7 and/or the validation unit 54 may be arranged for storing their outputs in the memory.

The system 50 may be included in a server system of an internet service provider, for example, to monitor validity of data transported via the server system in a computationally inexpensive way. The system 50 may also be included in a consumer electronics device such as a digital television, set-top box, hand-held media player, or other types of equipment. The system 10 may be included in a digital mastering system, for example.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. It will also be appreciated that such a program may have many different architectural designs. For example, a program code implementing the functionality of the method or system according to the invention may be subdivided into one or more subroutines. Many different ways to distribute the functionality among these subroutines will be apparent to the skilled person. The subroutines may be stored together in one executable file to form a self-contained program. Such an executable file may comprise computer executable instructions, for example processor instructions and/or interpreter instructions (e.g. Java interpreter instructions). Alternatively, one or more or all of the subroutines may be stored in at least one external library file and linked with a main program either statically or dynamically, e.g. at run-time. The main program contains at least one call to at least one of the subroutines. Also, the subroutines may comprise function calls to each other. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth. These instructions may be subdivided into subroutines and/or be stored in one or more files that may be linked statically or dynamically.

The carrier of a computer program may be any entity or device capable of carrying the program. For example, the carrier may include a storage medium, such as a ROM, for example a CD ROM or a semiconductor ROM, or a magnetic recording medium, for example a floppy disc or hard disk. Further the carrier may be a transmissible carrier such as an electrical or optical signal, which may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for identifying a content item, comprising:
   an input for receiving:
   a received first identifier of the content item, the received first identifier being based on at least part of a baseband level representation of the content item;
   a received second identifier of the content item, the received second identifier being based on at least part of an encoded representation of the content item; and
   the at least part of the encoded representation of the content item, wherein the input is arranged for receiving a signed message comprising the received first identifier and the received second identifier;
   the system further comprising:
   a second identifier generator for generating a generated second identifier based on the at least part of the encoded representation of the content item;
   a validation unit for validating the received first identifier as a valid first identifier of the content item if the generated second identifier matches the received second identifier;
   a non-transitory memory device for storing at least one of the identifiers
   a signature generator for digitally signing the message; and
   a signature handler for validating a signature of the signed message.

2. The system of claim 1, the received first identifier being indicative of a fingerprint of or a watermark embedded in the baseband level representation of the content item.

3. The system of claim 1, the received second identifier being indicative of a hash value of the at least part of the encoded representation of the content item.

4. The system of claim 1, further comprising a first identifier requester for requesting a validated first identifier of the content item from an external source if the generated second identifier does not match the received second identifier.

5. The system of claim 1, further comprising:
   a decoder for decoding the at least part of the encoded representation into at least part of the baseband level representation of the content item; and
   a first identifier generator for generating a computed first identifier by processing the at least part of the baseband level representation of the content item if the generated second identifier does not match the received second identifier.

6. The system of claim 1, the encoded representation of the content item comprising at least part of a compressed representation, a multiplex level representation, or a transport level representation of the at least part of the baseband level representation of the content item.

7. A consumer electronics device comprising the system according to claim 1.

8. A method of identifying a content item, comprising:
   receiving a received first identifier of a content item, the received first identifier being based on at least part of a baseband level representation of the content item;
   receiving a received second identifier of the content item, the received second identifier being based on at least part of an encoded representation of the content item;
   receiving the at least part of the encoded representation of the content item;
   receiving a signed message comprising the received first identifier and the received second identifier:
   the method futher comprising:
   generating a generated second identifier of the content item based on the at least part of the encoded representation of the content item;
   validating the received first identifier as a valid first identifier of the content item if the generated second identifier matches the received second identifier,
   wherein the method futher comprising:
   digitally signing the message; and
   validating a signature of the signed message.

9. A non-transitory computer readable storage medium embedded with computer program instructions for causing a processing system to perform the method of claim 8.

* * * * *